United States Patent Office 3,047,569
Patented July 31, 1962

3,047,569
SUBSTITUTED STEROIDS OF THE
PREGNANE SERIES
Chester E. Holmlund, Pearl River, Louis I. Feldman, Spring Valley, and Henry M. Kissman, Nanuet, N.Y., and Martin J. Weiss, Oradell, N.J., assignors to American Cyanamid Company, New York, N.Y., a corporation of Maine
No Drawing. Filed Jan. 31, 1961, Ser. No. 86,010
7 Claims. (Cl. 260—239.55)

This invention relates to the microbiological dehydrogenation of steroids. More particularly, it relates to the 1,2-dehydrogenation of pregnenes and intermediates formed in carrying out the process of the invention.

One of the starting materials for the process of the present invention is 17α,20;20,21-bismethylenedioxy-4-pregnene-3,11-dione (I) which is described by F. Hoffman et al., J. Am. Chem. Soc., 80, 5322 (1958). This compound is reacted with sodium methoxide and methyl oxalate in a solvent to produce 3-hydroxy-2-methoxalyl-17α,20;20,21 - bismethylenedioxy - 2,4 - pregnadiene 11-one (II). The latter compound is treated with perchloryl fluoride in the presence of methanolic sodium methoxide solution and subsequently with an alkali metal acetate. The product obtained is 2α-fluoro-17α,20;20,21-bismethylenedioxy-4-pregnene-3,11-dione (III).

The product obtained immediately above (III) is heated with 60% aqueous formic acid for from 10 minutes to 60 minutes. The resulting product is 2α-fluoro-17α,21-dihydroxy-4-pregnene-3,11,20-trione (IV). This product can also be named 2α-fluoro-cortisone.

The latter compound can then be microbiologically dehydrogenated under aerobic fermentative conditions in a suitable medium at a temperature within the range of from about 22° C. to 40° C. for a period of from 1 to 6 days. The microbiological dehydrogenation can be carried out with various species of Nocardia such as *Nocardia corallina* (ATCC 999), *Nocardia opaca* (ATCC 4276), *Nocardia asteroides* (ATCC 3308), *Nocardia blackwellii* (ATCC 6846) and so forth as hereinafter described in Example 6. The mocrobiological process is followed by paper chromatographic assay until the product is obtained. At this point, the material is harvested using conventional techniques of extraction with a suitable solvent at optimum pH. While the use of the various organisms as 1,2-dehydrogenating agents in corticosterone steroids is generally known and might be expected to extend to the 2-substituted substrates, it is surprising that in many instances attempts to produce the $\Delta^{1,2}$ derivatives has been unsuccessful. For example, the use of 9α-fluoro-2β,11β,21-trihydroxy - 16α,17α - isopropylidenedioxy - 4 - pregnene-3,20 - dione; 9α - fluoro - 1ε,11β,17α,21 - tetrahydroxy-4 - pregnene - 3,20 - dione and 1ε,11β,17α,21 - tetrahydroxy-4-pregnene-3,20-dione as substrates failed to give the desired $\Delta^{1,2}$ steroid. On the other hand, unexpectedly the 2α-fluoro steroid substrates of the present invention readily yield the 1,2-dehydrogenated product. During the dehydrogenation, a hydrogen atom is removed from both the 1 and 2 carbon positions of steroid ring A. The exact mechanism of this dehydrogenation is unknown but it is considered to be an enzymatic reaction. In carrying out the fermentation process, a suitable nutrient medium is used which contains a soluble source of carbon, nitrogen and mineral elements. Sources of carbon include sugars such as glucose, sucrose, maltose, dextrose, xylose, galactoses and so forth; also alcohols such as glycerol or mannitol; corn starch and so forth; organic acids such as citric acid, maleic acid, acetic acid; and various natural products containing carbohydrates such as corn steeped liquor, soya bean meal, cotton seed meal and many available materials which have been used heretofore as a source of carbon in fermentation processes. Usually a variety of the above can be employed in the medium with good results. Suitable sources of nitrogen include some of the above named materials such as corn steep liquor, soya bean meal, cotton seed meal and the like and various other substances such as beef extract, casein, yeast, enzymatically digested proteins and degradation products including peptones, amino acids, and many other available proteinaceous materials which have been found to be suitable in supporting the growth of microorganisms. Inorganic sources of nitrogen include urea, ammonium salts, nitrates and the like, may be used in the medium as a source of nitrogen to provide a favorable growth of the organism.

The mineral requirements of fermentation are usually supplied in the crude materials which are often used as sources of carbon and nitrogen or a water that is used in the process. However, it may be favorable to supplement the minerals normally present with added amounts to obtain a maximum growth of microorganisms. Cations and anions which may be desirable in added amounts include sodium, potassium, calcium, magnesium, sulfate, phosphate, chloride, cobalt, manganese and various others. The use of other elements such as boron, copper, cobalt, molybdenum and chromium have been found desirable in some instances.

The 1,4-pregnadienes obtained in the above described microbiological process such as, for example, 2-fluoroprednisone are dissolved in pyridine in the presence of acetic anhydride. After reaction is complete, water is added and the crude product purified by recrystallization. The product obtained when 2-fluoroprednisone is used is, for example, 2-fluoro-17α-hydroxy-21-acetoxy-1,4-pregnadiene-3,11,20-trione (VI).

The following flowsheet illustrates the various reactions of the present invention.

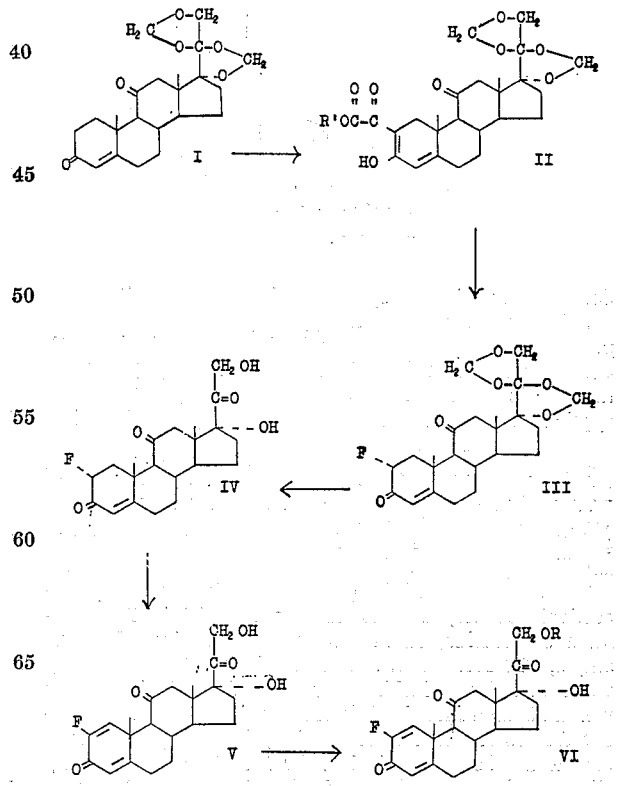

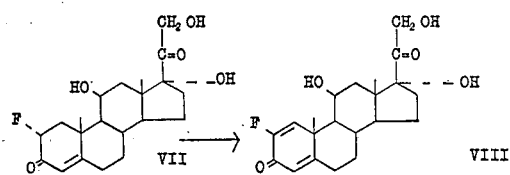

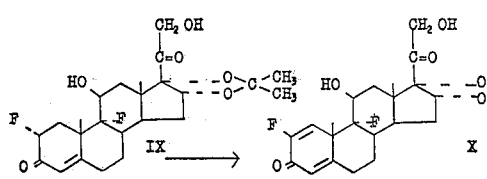

wherein R is a lower alkanoyl radical and R' is a lower alkyl radical.

The 2-lower alkoxalyl steroids such as compound (II) of the flowsheet theoretically can occur in several tautomeric forms as follows:

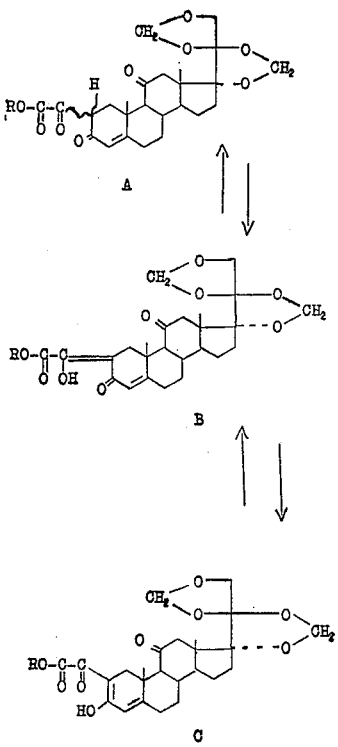

On the basis of spectrophotometric evidence (ultraviolet and infrared absorption data), it appears that the compounds synthesized are most likely tautomeric form C. On the other hand, if it should be found that the stable tautomeric form is one of the other configurations, the application should not be considered in any way defective.

Other 2α-fluoro-Δ⁴-3-ones, for example, 2α-fluorohydrocortisone (VII) and 2α,9α-difluoro-11β, 21-dihydroxy-16α,17α - isopropylidenedioxy-1,4-pregnadiene-3,20-dione (IX) can similarly be converted by microbial dehydrogenation to the corresponding 2-fluoro-Δ$^{1,4}$-3-ones (VIII and X, respectively).

The compounds of the present invention possess glucocorticoid activity and therefore are useful in the treatment of arthritis, bursitis, burns and the like. For example, 2-fluoroprednisone has glucocorticoid activity while completely lacking any mineralocorticoid activity which distinguishes the 2-fluoro steroid from other fluorinated steroids. In this connection, 6α-fluoroprednisolone acetate has been described in the literature as displaying slight sodium retention and also 9α-fluoroprednisolone has been clinically shown to promote moderate sodium retention (J. Clin. Invest., 38, 681 (1959)). The compounds of the present invention can be used as intermediates to prepare the corresponding 21-deoxy steroids by methods well known to those skilled in the art.

The following examples illustrate in detail the preparation of representative compounds of the present invention.

EXAMPLE 1

*Preparation of 3-Hydroxy-2-Methoxalyl-17α,20:20,21-Bismethylenedioxy-2,4-Pregnadiene-11-One (II)*

A solution of sodium (9.66 g., 0.42 mole) in anhydrous methanol (150 ml.) in a 2 liter flask is evaporated to dryness. A solution of methyl oxalate (90.0 g., 0.756 mole) in benzene (1800 ml.) is azeotropically distilled to a final volume of 1300 ml. 17α,20:20,21-bismethylenedioxy-4-pregnene-3,11-dione (I) (151.2 g., 0.378 mole) is partially dissolved in the methyl oxalate-benzene solution and the resulting suspension is allowed to cool to room temperature. The suspension is then added to the sodium methoxide residue; and additional 200 ml. of anhydrous benzene is used to aid in the transfer. The resulting mixture is stirred at room temperature for 21 hours and is then drowned in petroleum ether (ca. 6 liters). The solids are filtered, pressed dry, ground in a mortar and dissolved in about 22 liters of water. A small quantity of insoluble material (A) is filtered off. As soon as practical, the filtrate is acidified with dilute aqueous hydrochloric acid. The resulting white solids are collected by filtration, washed with water, pressed dry and dissolved in methylene chloride. The methylene chloride solution is extracted with water until the aqueous extracts are no longer acidic and is then dried over magnesium sulfate. The solution is concentrated to about 400 ml. Benzene is added and evaporation (boiling) is continued while benzene is periodically added to maintain the volume at 400 ml. When the boiling point reaches 69° C. the mixture is cooled and the precipitated yellow crystals are filtered to give 96.3 g. of product. Further concentration of the mother liquor (to 25 ml.) gives an additional 5.5 g. of product. A third crop (8.5 g.) is obtained by concentration of the second mother liquor to near dryness and the addition of acetone.

The above-mentioned water-insoluble material (A) is washed several times with water and then extracted with benzene. The benzene solvent is evaporated and the residual material is dissolved in methylene dichloride, the resulting solution is filtered and the solvent evaporated. The residual solids are dissolved in hot acetone (600 ml.); the acetone solution is concentrated (by boiling) to about 200 ml. and petroleum ether (B.P. 20–40° C.) is added. The mixture is cooled and the precipitated crystals are collected; yield—16.5 g. Three additional crops amounting to 7.7 g. are obtained on further work-up of the mother liquor. The total yield of 3-hydroxy-2-methoxalyl - 17α,20:20,21 - bismethylenedioxy-2,4-pregnadiene-11-one (II) is 134.5 g. A sample after recrystallization from methanol-benzene gave yellow crystals, melting point 208–212° C., which analyzed satisfactorily for a compound with empirical formula $C_{24}H_{32}O_9$;

$\lambda_{max}^{KBr}$ 5.78, 5.86, 6.12, 6.31μ; $\lambda_{max}^{MeOH}$ 240 mμ; 320–352 mμ (plateau).

EXAMPLE 2

*Preparation of 2α-Fluoro-17α-20:20,21-Bismethylenedioxy-4-Pregnene-3,11-Dione (III)*

To a suspension of 0.977 g. of 3-hydroxy-2-methoxalyl-17α,20:20,21 - bismethylenedioxy-2,4-pregnadiene-11-one (II) in 35 ml. of methanol cooled to −10° C. is added 5 ml. of a 1 N methanolic sodium methoxide solution. The stirred homogeneous solution is treated with perchloryl fluoride gas for several minutes and is then evaporated under reduced pressure. The residue containing 2-fluoro- 2-methoxalyl - 17α,20:20,21 - bismethylenedioxy-4-pregnene-3,11-dione is dissolved in methanol and treated with 1.6 g. of potassium acetate at the reflux point for 75 minutes. The mixture is then evaporated under reduced pressure and the residue is dissolved in a mixture of chloroform and water. The organic phase is washed once with water and is dried over magnesium sulfate and evaporated under reduced pressure. The residue is crystallized and recrystallized from ether to give 2α-fluoro-17α,20:20,21-bismethylenedioxy - 4 - pregnene-3,11-dione (III);

$\lambda_{max.}^{MeOH}$ 238mμ (ε 14,000); $\lambda_{max.}^{KBr}$ 5.88μ

EXAMPLE 3

*Preparation of 2α-Fluorocortisone (2α-Fluoro-17α,21-Dihydroxy-4-Pregnene-3,11,20-Trione) (IV)*

A mixture of 0.53 g. of 2α-fluoro-17,20:20,21-bismethylenedioxy-4-pregnene-3,11-dione (III) and 20 ml. of 60% aqueous formic acid is heated on the steam bath for 30 minutes and is then evaporated under reduced pressure. The residue is dissolved in methylene chloride and the solution is washed with a small amount of water. The methylene chloride solution is dried over magnesium sulfate and the solvent is removed under reduced pressure. The residue is crystallized and recrystallized from ethyl acetate to give 2α-fluorocortisone (IV);

$\lambda_{max.}^{MeOH}$ 238 mμ (ε 13,900); $\lambda_{max.}^{KBr}$ 5.86μ, 5.92μ

EXAMPLE 4

*Preparation of 2-Fluoroprednisone (V)*

Fifty 500 ml. Erlenmeyer flasks each containing 100 ml. of sterile medium consisting of cerelose, 1.0%, yeast extract, 0.1%, NaCl, 0.25%, beef extract, 0.4%, peptone, 0.4%, water q.s. ad 100.0% at pH 7.0 are inoculated with an 8 hour growth of *Nocardia corallina* (ATCC 999), and incubated on a reciprocating shaker (120 strokes per minute) at 28° C. for 17 hours. At this time, 10 mg. of 2α-fluorocortisone (IV) dissolved in 1 ml. of methanol is added to each flask and the fermentation continued for 2 hours. At this time a goodly quantity of 2-fluoroprednisone is produced. The flasks are harvested, pooled and extracted with ethyl acetate. The ethyl acetate extract is concentrated under reduced pressure to a residue. The residue is dissolved in the bottom phase of a solvent system consisting of 1 part water, 5 parts dioxane and 7 parts cyclohexane and chromatographed on a partition column wherein diatomaceous earth, moistened with bottom phase, is the inert support. Development with top phase of the above described solvent system permits elution of the product in a fraction collected at 4.7 hold back volumes. This fraction is concentrated to dryness under reduced pressure and the semicrystalline residue dissolved in warm acetone. Crystals separate on cooling. These are filtered off, redissolved in acetone, decolorized with activated charcoal and the desired product recrystallized upon the addition of petroleum ether. 2-fluoro-17α,21-dihydroxy1,4-pregnadiene-3,11,20-trione (2-fluoroprednisone, V), melts at 232-236° C.

EXAMPLE 5

*Preparation of 2-Fluoroprednisone 21-Acetate (21-Acetoxy - 2-Fluoro-17α-Hydroxy-1,4-Pregnadiene-3,11,20-Trione (VI—R=Acetyl)*

100 mg. of 2-fluoroprednisone are dissolved in 2 ml. of pyridine and 0.5 ml. of acetic anhydride is added. The temperature of the reaction mixture is maintained at approximately room temperature. After the reaction is complete, water is added to precipitate the crude product which is crystallized from acetone-petroleum ether to yield pure 2-fluoroprednisone 21-acetate.

EXAMPLE 6

In a manner similar to that of Example 4, 2-fluoroprednisone (V) is obtained in each instance by submitting 2α-fluorocortisone (IV) to fermentation with each of the following cultures:

*Nocardia corallina* (*Mycobacterium rhodochrous*) ATCC 999
*Nocardia opaca* (*Mycobacterium rhodochrous*) ATCC 4276
*Nocardia asteroides* ATCC 3308
*Nocardia blackwellii* (*Nocardia asteroides*) ATCC 6846
*Corynebacterium* (*Arthrobacter*) *simplex* ATCC 6946
*Bacillus sphaericus* (var. *fusiformis*) ATCC 7055
*Protaminobacter alboflavus* ATCC 8558
*Mycobacterium phlei* ATCC 354
*Fusarium solani* ATCC 12823
*Septomyxa affinis* ATCC 6737
*Didymella lycopersici* ATCC 11847

The 2-fluoroprednisone is separated and purified as described in Example 4.

EXAMPLE 7

Following the procedure outlined in Example 4, 2α-fluorohydrocortisone (VII) (Kissman et al., J. Amer. Chem. Soc., 81, 1262 (1959)), is fermented with *Nocardia corallina* and the product obtained is 2-fluoro-11β,17α,21-trihydroxy-1,4-pregnadiene-3,20-dione, (2-fluoroprednisolone), (VIII). This compound proved to be less polar than the starting material.

EXAMPLE 8

*Preparation of 2,9α-Difluoro-11β,21-Dihydroxy-16α,17α-Isopropylidenedioxy-1,4-Pregnadiene-3,20-Dione (X)*

A solution of 0.5 g. of 11β,21-dihydroxy-9α-fluoro-16α,17α - isopropylidenedioxyprogesterone (J. Amer. Chem. Soc., 80, 2338 (1958)) in 20 cc. of dihydropyran is cooled to 0° C. There is added with stirring dropwise 1 cc. of concentrated hydrochloric acid at a rate slow enough to keep the internal temperature between 10–20°. The mixture is then stirred at room temperature for one hour. Hexane (100 cc.) is added and the mixture is cooled in the refrigerator overnight. The solid which precipitates out during this time is collected by filtration and is washed thoroughly with hexane and is air dried. The 9α-fluoro-11β-hydroxy-16α,17α-isopropylidenedioxy-21-(tetrahydropyran-2-yloxy)progesterone is recrystallized from ethyl acetate to give 0.4 g. with melting point 200–205° C.

A solution of 0.389 g. of sodium in 8 cc. of methanol and 126 cc. of benzene is distilled until the distillation temperature reaches 80° C. To the cooled solution is then added 3 cc. of ethyl oxalate and 2.7 g. of 9α-fluoro-11β-hydroxy-16α,17α-isopropylidenedioxy-21-(tetrahydropyran-2-yloxy)-progesterone and the reaction mixture is stirred at room temperature for 16 hours. Some 250 cc. of ether is added and the dark red mixture is extracted 10 times with 25 cc. portions of ice cold 1% aqueous potassium hydroxide solution. The extracts are washed with ether and are then poured into enough 30% sodium dihydrogen phosphate solution to keep the mixture at pH 5–6. This mixture is in turn extracted quickly with several portions of chloroform and the combined extracts are washed with water, dried over magnesium sulfate, filtered and evaporated under reduced pressure. The yellow residue (2.5 g.) is chromatographed on 50 g. of silica gel from benzene. Elution with benzene containing increasing amounts of anhydrous ether brings down 0.8 g. of 2-ethoxalyl-9α-fluoro-11β-hydroxy-16α,17α-isopropylidenedioxy - 21 - (tetrahydropyran-2-yloxy)-progesterone as a yellow, amorphous solid which gives a strong positive ferric chloride test.

To a cold (−10° C.) solution of 0.62 g. of 2-ethoxalyl-9α - fluoro - 11β - hydroxy - 16α,17α - isopropylidenedioxy- 21-(tetrahydropyran-2-yloxy)-progesterone in 30 cc. of methanol is added 2 cc. of a 1 N methanolic sodium methoxide solution. Perchloryl fluoride gas is passed into solution until the latter is neutral. The mixture is then evaporated under reduced pressure and the residue is dissolved in a mixture of water and chloroform. The layers are separated and the water phase is extracted with several portions of chloroform. The combined chloroform extracts are washed with a little water, dried over magnesium sulfate and evaporated under reduced pressure. The residue is redissolved in 30 cc. of methanol and to the solution is added 1 g. of potassium acetate. The mixture is allowed to reflux for one hour and is then evaporated under reduced pressure. The residue is partitioned between water and chloroform and the water phase is extracted with several portions of chloroform. The combined chloroform extracts are washed with a little water, dried over magnesium sulfate and freed from solvent under reduced pressure. The residue (0.5 g.) is dissolved in benzene (5 cc.) and the colored solution is added to a column (13 x 1.5 cm.) of 15 g. of silica gel which had been wetted down with benzene. Elution of the column with 100 cc. of benzene and 100 cc. of 15% benzene-ether gives fractions which are discarded. Further elution with 100 cc. of ether yields, after evaporation under reduced pressure, 0.25 g. of crystalline material which is recrystallized from ether to give 0.14 g. of 2α,9α-difluoro-11β-hydroxy - 16α,17α - isopropylidenedioxy - 21 - (tetrahydropyran-2-yloxy)-progesterone as a white crystalline solid; melting point 210–212° C.

A solution of 0.3 g. of 2α,9α-difluoro-11β-hydroxy-16α, 17α - isopropylidenedioxy - 21 - (tetrahydropyran - 2-yloxy)-progesterone in 90 cc. of methanol and 15 cc. of water containing 1.5 cc. of 8% aqueous sulfuric acid is stirred at room temperature for one hour. The solution is then neutralized by mixing it with a weakly basic anion exchange resin (OH form). The resin is removed by filtration and is washed with methanol. The filtrate and washings are combined and evaporated under reduced pressure. This leaves 0.19 g. of 2α,9α-difluoro-11β,21-dihydroxy - 16α,17α - isopropylidenedioxy - 4 - pregnene-3,20-dione of a white solid which showed $\lambda_{max.}^{KBr}$ 5.79μ and 5.92μ (carbonyl region)

The product 2α,9α-difluoro-11β,21-dihydroxy-16α,17α-isopropylidenedioxy-4-pregnene-3,20-dione (IX) obtained immediately above is fermented with Nocardia corallina as described in Example 4. The fermentation product obtained is 2,9α-difluoro-11β,21-dihydroxy-16α,17α-isopropylidenedioxy-1,4-pregnadiene-3,20-dione (X) which is less polar than the starting substrate.

We claim:
1. The compound 3-hydroxy-2-methoxalyl-17α,20:20, 21-bismethylenedioxy-2,4-pregnadiene-11-one.
2. The compound 2α-fluoro-17α,20:20,21-bismethylenedioxy-4-pregnene-3,11-dione.
3. The compound 2-fluoro-17α,21-dihydroxy-1,4-pregnadiene-3,11,20-trione.
4. The compound 21-acetoxy-2-fluoro-17α-hydroxy-1,4-pregnadiene-3,11,20-trione.
5. The compound 2,9α-difluoro-11β,21-dihydroxy-16α, 17α-isopropylidenedioxy-1,4-pregnadiene-3,20-dione.
6. The 3-hydroxy-2-lower alkoxalyl-17α,20:20,21-bismethylenedioxy-2,4-pregnadiene-11-ones.
7. The 21-lower alkanoyloxy-2-fluoro-17α-hydroxy-1,4-pregnadiene-3,11,20-triones.

References Cited in the file of this patent
UNITED STATES PATENTS
2,837,464     Nobile _____ June 3, 1958

OTHER REFERENCES
Kissman et al.: J.A.C.S., vol. 81, p. 1262, March 1959.